United States Patent
Merwin et al.

(10) Patent No.: US 7,046,769 B2
(45) Date of Patent: May 16, 2006

(54) COMPUTERIZED SYSTEM FOR THE RECEIPT, RECORDATION, SCHEDULING AND REDELIVERY OF TELEPHONE MESSAGES TO PREDETERMINED TELEPHONE NUMBERS

(75) Inventors: Keith A. Merwin, Jacksonville, FL (US); Robert J. van Winkel, Jacksonville, FL (US)

(73) Assignee: Ringminder, Inc., Ponte Vedra Beach, FL (US)

( * ) Notice: Subject to any disclaimer, the term of this patent is extended or adjusted under 35 U.S.C. 154(b) by 225 days.

(21) Appl. No.: 09/892,938

(22) Filed: Jun. 27, 2001

(65) Prior Publication Data

US 2002/0001369 A1 Jan. 3, 2002

Related U.S. Application Data

(63) Continuation-in-part of application No. 09/605,477, filed on Jun. 28, 2000, now Pat. No. 6,731,725.

(51) Int. Cl.
*H04M 1/64* (2006.01)
*H04M 3/42* (2006.01)

(52) U.S. Cl. .......................... 379/67.1; 379/72; 379/76; 379/88.12; 379/88.17; 379/88.18; 379/201.01; 379/201.02; 379/201.07; 379/210.01

(58) Field of Classification Search ............... 379/67.1, 379/71, 76, 72, 88.12, 88.17, 88.18, 201.01, 379/201.02, 201.07, 210.01
See application file for complete search history.

(56) References Cited

U.S. PATENT DOCUMENTS

| | | | | |
|---|---|---|---|---|
| 4,941,168 A | * | 7/1990 | Kelly, Jr. .................... 379/69 |
| 4,972,461 A | * | 11/1990 | Brown et al. ................. 379/67 |
| 5,260,986 A | * | 11/1993 | Pershan ....................... 379/57 |
| 5,652,789 A | * | 7/1997 | Miner et al. ............ 379/201.01 |
| 5,937,161 A | * | 8/1999 | Mulligan et al. ........... 709/206 |
| 6,014,429 A | * | 1/2000 | LaPorta et al. ........... 379/88.15 |
| 6,269,151 B1 | * | 7/2001 | Hanson ....................... 379/69 |
| 6,324,262 B1 | * | 11/2001 | Tuttle .......................... 379/69 |
| 6,396,920 B1 | * | 5/2002 | Cox et al. .............. 379/266.02 |
| 6,731,725 B1 | * | 5/2004 | Merwin et al. .......... 379/88.23 |

* cited by examiner

*Primary Examiner*—Allan Hoosain
(74) *Attorney, Agent, or Firm*—Arthur G. Yeager

(57) ABSTRACT

An automated, computerized voice message storage and redelivery system and method comprises a computer for executing software commands, a telephone connection operatively connected to the computer for calling and answering a telephone call from a remote location, and signal recognition capability operatively connected to the telephone connection and to the computer for determining if a telephone called from the telephone connection has been answered by a human voice or by a digital voice. Memory is operatively connected to the computer for storing voice messages for remembering the number of each remote telephone, programs for operating the computer for receiving, recording, and redelivery of voice messages. The programs include calling a remote telephone number; determining if the telephone number is answered and determining by the signal recognition capability if a human voice or digital voice has answered the telephone; and for providing that if a digital voice answers the telephone whether such digital voice is an automated attendant answering system (AAA), a voice mail system (VMS), or an automated answer machine (AAM). The call can be transferred to another telephone number if such number was recorded if an AAA or VMS answers the telephone; and providing by the SRS the message recorded to the AAM if an AAM answers the call.

19 Claims, 6 Drawing Sheets

COMPUTERIZED SYSTEM FOR THE RECEIPT, RECORDATION, SCHEDULING AND REDELIVERY OF TELEPHONE MESSAGES TO PREDETERMINED TELEPHONE NUMBERS

CROSS-REFERENCE TO RELATED APPLICATION

The present application is a continuation-in-part of U.S. appl. Ser. No. 09/605,477, "COMPUTERIZED SYSTEM FOR THE RECEIPT, RECORDATION, SCHEDULING AND REDELIVERY OF TELEPHONE MESSAGES TO PREDETERMINED TELEPHONE NUMBERS", filed Jun. 28, 2000 now U.S. Pat. No. 6,731,725 by the applicants herein.

NOTICE

A portion of the disclosure of this patent document contains material, which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to voice message recordation and redelivery systems, and particularly to those which actively telephone a subscriber and deliver the message to a human recipient rather than to a voice mail or answering machine system.

2. Related Art

A wide variety of message handling systems are known to the prior art. There are also a wide variety of systems that provide for the delivery of messages at predetermined dates and times. Most of these systems, however, do not specifically require the detection of the human voice of the subscriber but simply direct messages to voice mail or answering machines. What is desired is a system designed to specifically locate the subscriber individually and to do so in a relatively simple and inexpensive manner that is fully automated. In addition, the system should have specific capability to relay calls through a telephone system to locate the end user.

BRIEF SUMMARY OF THE INVENTION

In one aspect of the present invention there is provided a method of scheduling and receiving by a user a reminder call from an automated, computerized voice message storage and redelivery system (SRS) comprising the steps of: providing to the SRS when a reminder call is to be made by the SRS; providing to the SRS each telephone number that is to be called by the SRS to deliver a reminder call; providing to the SRS the message to be included in the reminder call; recording by the SRS the information provided; calling a telephone number as provided; if the telephone number is answered, determining by the SRS if a human voice or digital voice has answered the telephone; and selecting the manner in which the message will be delivered. The invention also includes the steps if a digital voice answers the telephone, determining if the digital voice is an automated attendant answering system (AAA), a voice mail system (VMS), or an automated answer machine (AAM); and if an automated answer machine answers the call, providing by the SRS the message recorded to the AAM. If an AAA or VMS answers the telephone, requesting by the SRS that the call be transferred to another telephone number if such was recorded. If such other telephone number is answered, providing by the SRS the message recorded to the one who answers.

Additional steps include providing the date a reminder call is to be made by the SRS; providing the time a reminder call is to be made by the SRS; providing to the SRS more than one telephone number that is to be called; and providing to the SRS the order that the telephone numbers requested are to be called. Other steps include calling the telephone number on the date obtained and at the time provided. If a digital voice is detected by the SRS, calling the telephone number at time intervals determined by the SRS; providing to the SRS the number of attempts to be made by the SRS to detect a digital voice at the telephone number called; calling the first telephone number in the order obtained; if the telephone is not answered by either a human or digital voice calling the second telephone number; and if the second telephone number obtained is called and is not answered by either a human or a digital voice, calling the third telephone number if one was obtained. In addition, the steps include repeating the three preceding steps a predetermined number if tunes and, if no number is answered by either a human voice or digital voice, hanging up the SRS telephone connection.

In another aspect of the invention there is provided an automated, computerized voice message storage and redelivery system comprising a computer means for executing software commands, a telephone connection means operatively connected to the computer means for calling and answering a telephone call from a remote location, a signal recognition means operatively connected to the telephone connection means and to the computer means for determining if a telephone called from the telephone connection means has been answered by a human voice or by a digital voice, memory means operatively connected to the computer means for storing voice messages for remembering the number of each remote telephone, program means for operating the computer means for receiving, recording, and redelivery of voice messages. The program means includes means for calling a remote telephone number; means for determining if the telephone number is answered and determining by the signal recognition means if a human voice or digital voice has answered the telephone; means for providing that if a digital voice answers the telephone whether such digital voice is an automated attendant answering system (AAA), a voice mail system (VMSS), or an automated answer machine (AAM). There is also means for requesting by the SRS that the call be transferred to another telephone number if such number was recorded if an AAA or VMS answers the telephone. Additional means includes means for providing by the SRS the message recorded to the one who answers if such other telephone number is answered, and means for providing by the SRS the message recorded to the AAM if an AAM answers the call.

BRIEF DESCRIPTION OF THE SEVERAL VIEWS OF THE DRAWING

The novel features which are believed to be characteristic of this invention are set forth with particularity in the appended claims. The invention itself, however, both as to its organization and method of operation, together with further objects and advantages thereof, may best be understood by reference to the following description, taken in connection with the accompanying drawings, in which:

DETAILED DESCRIPTION OF THE INVENTION

Figure 1:
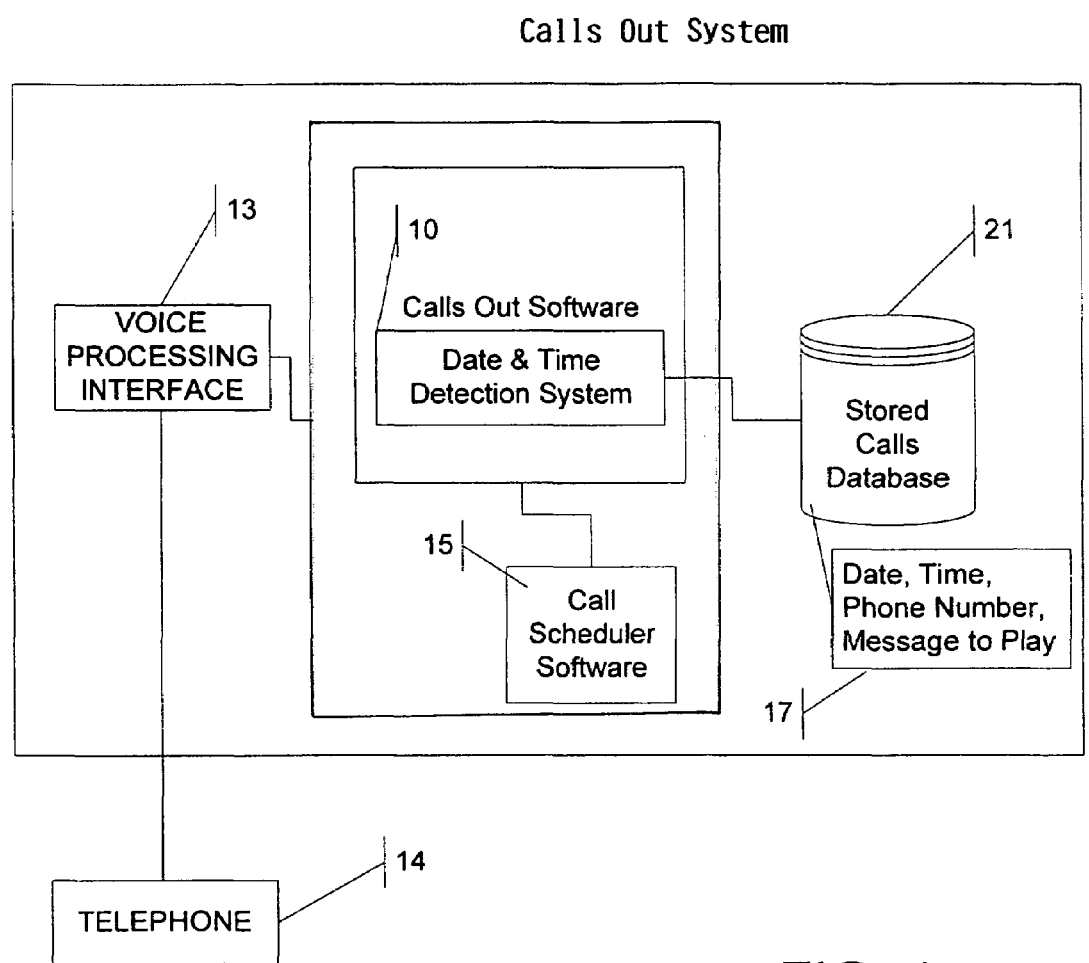
FIG. 1 is a simplified functional block diagram of the date and time detection system in accord with the present invention.

In recent years, telephone users have had available to them an extremely limited number of means by which they can employ their telephones as a means of leaving for themselves reminders or reminder messages, which are to be delivered in the future. Of those, none of the automated systems has the ability to contact the user and actively deliver such messages.

At the most basic level, there are service companies who provide telephone answering services or, in hotels, who provide wake up type messaging. These systems are helpful in their abilities to provide active effort to contact the recipient by telephone in order to deliver the message. However, these systems are not fully automated. They depend upon a human interaction component in order to connect between the user and the service. As such, they suffer a distinct disadvantage from the present invention, which provides the same service on a fully automated system.

Of the automated systems, none have the capacity to automate both the initial contact by the user via telephone and the delivery of the subsequent reminder message, and in so doing, retain the ability to contact the user and actively deliver such messages. For example, a number of voice messaging or voice mail systems have a future delivery option. Automated messaging systems for use with voice mail are known and many telephone companies offer a voice message delivery service under various names. This service allows telephone voice message system subscribers to access an automatic voice message system for callers to leave a message if the subscriber is not answering or if the telephone line is busy.

A voice mail future delivery option allows a person to record a message for himself or herself and then pick a date in the future for the message to be added to the recorded messages that the person checks periodically. Such a message is retrieved when that person takes the active steps of telephoning into the voice mail system, entering a personal identification number, listening to every recorded voice message and finding among them the personal, future delivery message the person left for himself or herself. Depending upon when and how often the voice mail user checks his or her voice mail messages, the future delivery message may or may not be timely. Further, the usefulness of the reminder system remains entirely dependent upon the person to remember to check the voice mail system on a frequent basis. This can be an extremely time consuming process.

Alternatively, a number of cellular and wireless telephones have a small database built into them which allows the owner to calendar the date and time for a reminder tone or beep on his or her telephone, followed by a text message which he or she has previously input. This function is limited by the size of the database, the need for the telephone battery to always have a charge and always be turned on lest a message be missed (a text only message), and the cumbersome process of using the telephone's touchtone keypad in order to "type" in the message in the first instance.

There does exist prior art that addresses the need for timely and active reminder messaging. For example, there are a number of Internet web sites which provide subscribers with reminder emails which are delivered to the subscribers' email address(es) at a predetermined date and time. Examples of these include those web sites located at www.lifeminders.com ("lifeminders"), www.mrwakeup.com ("mrwakeup") and www.seeyouonline.com ("seeyou").

Each of these systems has drawbacks that the present system solves. For example, with the lifeminders system, all reminder messages are recorded into the lifeminders system by the subscriber while sitting at his or her personal computer. Text messages are input and then transmitted to lifeminders via the Internet. At the appropriate date and time, the text message is then redelivered via email to the subscriber at his or her email address. There is no attempt to integrate a telephone reminder feature into the system, and as a result, the utility, timeliness and convenience of the system is significantly undermined by the user's need to be at his or her computer and online in order to both record and later receive the reminder message.

The mrwakeup system provides a partial integration of the telephone utilities available in the present invention. With mrwakeup, reminder messages are recorded into the mrwakeup system by the subscriber while sitting at his or her personal computer. Text messages are input and then transmitted to mrwakeup via the Internet. Subscribers also have an option to record a personal voice message. At the appropriate date and time, the text message is then redelivered via either telephone or email. The mrwakeup telephone application appears to come closer to the present invention. However, the process is a cumbersome one, and, in fact, does not provide a solution to the subscriber's need to be logged onto the Internet. For example, to access the mrwakeup system, the subscriber must be online. The subscriber inputs a request to schedule a telephone reminder voice message at the website and then transmits that request to the provider. The provider then initiates the sequence by telephoning the subscriber and requesting recordation of the message. If, as is often the case, the subscriber's telephone line serves both as a telephone line and as an Internet connection, the subscriber will then be compelled to go offline in order to receive the mrwakeup set up call.

A variant in this field is found in the invention disclosed in U.S. Pat. No. 5,944,786. The system detects when a user has received an e-mail and automatically generates a telephone call to the user to notify him or her that an e-mail has been received. The system does not deliver the E-mail itself, only a notification that e-mail has been received. The automated generation of telephone calls to the user is similar to the manner in which automated telephone calls are generated by the present invention. However, the '786 system does not have any facility for receiving telephone calls from a user and does not claim to be able to deliver reminder messages at a scheduled future time and date.

The basic features of the preferred embodiment of the present invention include the following:

Schedule Call

1. The subscriber places a telephone call to the automated, computerized voice message storage and redelivery system (SRS). The SRS then provides for:
2. Answering the telephone call and initializing data fields to receive the subscriber's data and to calculate the date of the initial call.
3. Retrieving the subscriber's origin telephone number via caller identification, and if available, cross referencing the caller id number against the SRS's database of known and authorized subscribers, and detecting the identity of the caller without the need to prompt the caller for a personal identification number.
4. Greeting the caller by name, if known, or greeting the caller with a request for entry of a personal identification number if the caller is telephoning from an unknown phone number.
5. Cross-checking the personal identification number against its database of known and authorized users and ensuring that the caller is authorized to use the system.
6. Prompting the subscriber to enter via touchtone keypad or voice the date and time that the reminder message is to be delivered to the subscriber in the future, then recording such data and, for purposes of accuracy, reporting to the subscriber the data to be stored.
7. Prompting the subscriber to enter via touchtone keypad voice the telephone number to which the SRS is to direct the reminder message in the future.
8. Prompting the subscriber to record, following a signal tone, the verbal message that he or she wishes to receive in the future and then recording same and saving it to random access memory or allowing the usage of a standard reminder message available in the system.
9. Reinitiating the data collection sequence and prompting the subscriber to record additional reminder calls.
10. Concluding the inbound telephone call session, and then assigning a file name for the voice message and saving the voice message to hard drive, updating an existing date and time file which records and schedules the redelivery of the voice message, checking the date and time file once per minute and, upon detecting a scheduled call, retrieving the file for the appropriate voice message.
11. The user can also indicate upon signing up for the service that certain of the numbers on the list created will be answered by a human voice and will require the SRS to request a transfer to an extension. This could be in the case of the user using his/her office telephone number; in which case the user's extension would be part of a COTS (Complex Office Telephone System—also known as PBX, Key System and Hybrid Key System/PBX). The user can also indicate upon signing up for the service that certain of the numbers on the list will be answered by a Digital Voice via a Digital Voice System (DVS) and will require the SRS to request a transfer to an extension. This case concerns a COTS answered by an Automated Attendant Answering System (AAS) Form of DVS. If the user has indicated that a certain number in the list will be answered by an AAS as part of a COTS, then the user will be required to indicate that this transfer request by the SRS be done in its own digital voice or by the use of DTMF digits. In addition, the user can indicate that a certain number in the list will be answered by an AAS as part of a COTS, then the user will be required to indicate that this transfer request by the SRS be done in its own digital voice or by the use of DTMF digits. In addition, the user can indicate that a certain number, after following the menu tree above, will be answered by a Voice Mail System (VMS) form of DVS and the SRS is to play the reminder message after the VMS answers the telephone call. This point should correspond to the telephone extension of the user (or one the user has designated). The user can also indicate that a certain number will be answered by a VMS or an Answer Machine form of digital voice. The user indicates with this choice that the SRS may leave the Reminder Message upon detecting the digital voice.
12. Finally, the user can further describe each number to be called on the list as having or not having some (but not limited to at this time) of the characteristics listed above.

Receive Call

13. Telephoning the predetermined telephone number and when the recipient telephone is answered, listening for and detecting a human voice.
14. Upon detecting a human voice, playing an appropriate salutation or requesting a transfer to an extension, replaying the subscriber's previously recorded voice message, and then terminating the outbound telephone sequence.
15. Upon detecting other than a human voice answer to the outbound telephone call, terminating the outbound telephone call and then doing one of two things depending upon the previously recorded request of the subscriber. The SRS either:
    A. redials the predetermined number at predetermined intervals until (1) the telephone call is answered and the SRS does detect a human voice and then delivers the previously recorded voice message or (2) the SRS fails on a predetermined number of consecutive attempts and then abandons the dialing sequence altogether; or
    B. accesses all of the predetermined telephone numbers assigned to the subscriber and then dials each number in cascading fashion until (1) the telephone call is answered and the SRS does detect a human voice whereupon the SRS delivers the previously recorded voice message or (2) the SRS fails on a predetermined number of consecutive attempts and then abandons the dialing sequence altogether.
16. If a digital voice system answer has been selected, the SRS will either play a voice recording to request a transfer to the user telephone extension or will play DTMF digits for that same request. The determining factor will be the user defining the type of answering at the far-end location that corresponds to that certain telephone number on his list. If the answer is from an AAM, the SRS can be instructed to leave a Reminder Message at this point.
17. The SRS also provides a utilities feature by which subscribers can:
    A. customize the performance characteristics of the SRS such that for outbound telephone calls, the SRS will either redial failed calls or turn to the above-mentioned cascading feature;
    B. change their personal identification numbers; or
    C. review and change the predetermined numbers to which the SRS will deliver recorded voice messages.

The automated, computerized voice message storage and redelivery system includes:

A. A computer, telephone or other means by which a user may provide data to the system.

B. An automated sequence of voice prompts seeking, by way of voice and/or touchtone keypad interface with the user, scheduling data received from the user for future delivery of voice messages. (Appendix "A" illustrates optional ways of providing the desired information).

C. A memory storing system by which scheduling data received from subscribers is added to and stored in a computerized scheduling file.

D. An automated system having the capability to:
  i. check the system's scheduling file every minute of every day and, upon detecting a scheduled call, to retrieve the file containing the appropriate voice message,
  ii. to telephone the scheduled telephone number or numbers, to listen for and detect a human voice,
  iii. upon detecting a human voice, to replay the previously recorded voice message,
  iv. and upon detecting a human voice and voice requesting a transfer to the user's telephone extension on the COTS.

E. A human voice detection facility, which instructs the SRS to terminate the outbound telephone call and to either redial the predetermined number at a preset interval until:
  i. the telephone call is answered by a human voice and then deliver the previously recorded voice message; or
  ii. to detect the system's inability to reach a human voice after a predetermined number of consecutive attempts and to then automatically instruct the system to abandon the dialing sequence,
  iii. if a call is answered by a non-human (DVS) the SRS will either by voice or DTMF digits request a transfer to the user's telephone system on the COTS. The request by voice or DTMF is based on the user's defining the characteristics of the AAS/VMS. Depending on the automated system being used by the user's COTS, a voice request or a DTMF digit request for transfer may be required.
  iv. if a call is answered by a DVS the SRS can leave a Reminder Message at this point. An example is telephone call answered by an Answer Machine.

F. A "cascading" device, which enables the system:
  i. to access all of the predetermined telephone numbers assigned to the subscriber and
  ii. then dial each number in cascading fashion (i.e., one telephone number after another) until
    (1) the telephone call is answered and the SRS does detect a human voice whereupon the system delivers the previously recorded voice message; or
    (2) the system fails on a predetermined number of consecutive attempts and then abandons the dialing sequence altogether.

The data fields to be entered in order to schedule a reminder message are such that the subscriber may input date, time and telephone number data via computer interface instead of or in addition to the telephone call.

System Operation

The present invention is an automated, computerized voice message storage and redelivery system (SRS) that provides for the receipt, recordation, and storage into individual computer files of telephonic or computer messages received from subscribers who provide the computer system and respond either verbally, or via touch-tone keypad to verbal prompts by the SRS, or other data entry means in order to enter scheduling data and who then record voice messages in response to prompts by the SRS. The SRS receives the subscriber's scheduling data and verbal messages and saves the same into random access memory. Once the subscriber has terminated the telephone call session, the SRS assigns a file name for the voice message and saves the message to a hard drive. The SRS then updates an existing date and time file, which records and schedules the redelivery of the voice message. The SRS automatically checks the file every minute of every day and, upon detecting a scheduled call, retrieves the file for the appropriate voice message, and telephones the predetermined number. When a recipient telephone is answered, the SRS is designed to listen for and detect a human voice. If a human voice is detected, the SRS then replays the previously recorded voice message. If a human voice is not detected, the SRS terminates the telephone call and then does one of two things depending upon the previously recorded request of the subscriber. The SRS redials the predetermined number at predetermined intervals until (1) the telephone call is answered and the SRS does detect a human voice and then delivers the previously recorded voice message or (2) the SRS fails on a predetermined number of consecutive attempts and then abandons the dialing sequence altogether. Alternatively, the SRS accesses all of the predetermined telephone numbers assigned to the subscriber and then dials each number in cascading fashion until (1) the telephone call is answered and the SRS does detect a human voice whereupon the SRS delivers the previously recorded voice message or (2) the SRS fails on a predetermined number of consecutive attempts and then abandons the dialing sequence altogether.

With respect to the drawings, FIG. 1 illustrates the Date and Time Detection System 10, which constantly checks the Stored Calls Database 21 for calls that need to be processed. If no call is required at this time the system continues to wait. If a call needs to be processed the Call Placement System 12 is started (FIG. 2).

Figure 2:
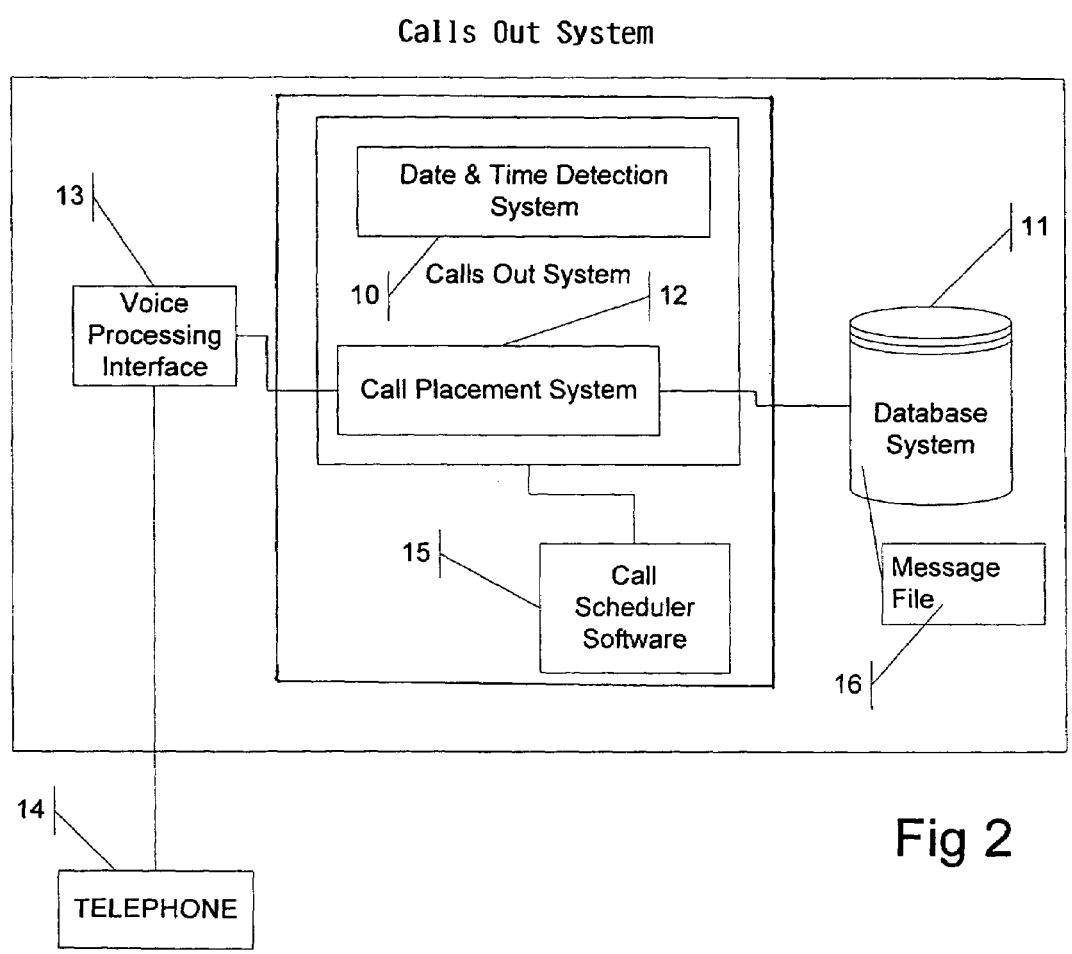
FIG. 2 is a simplified functional block diagram of the call placement system in accord with the present invention.
Figure 3:
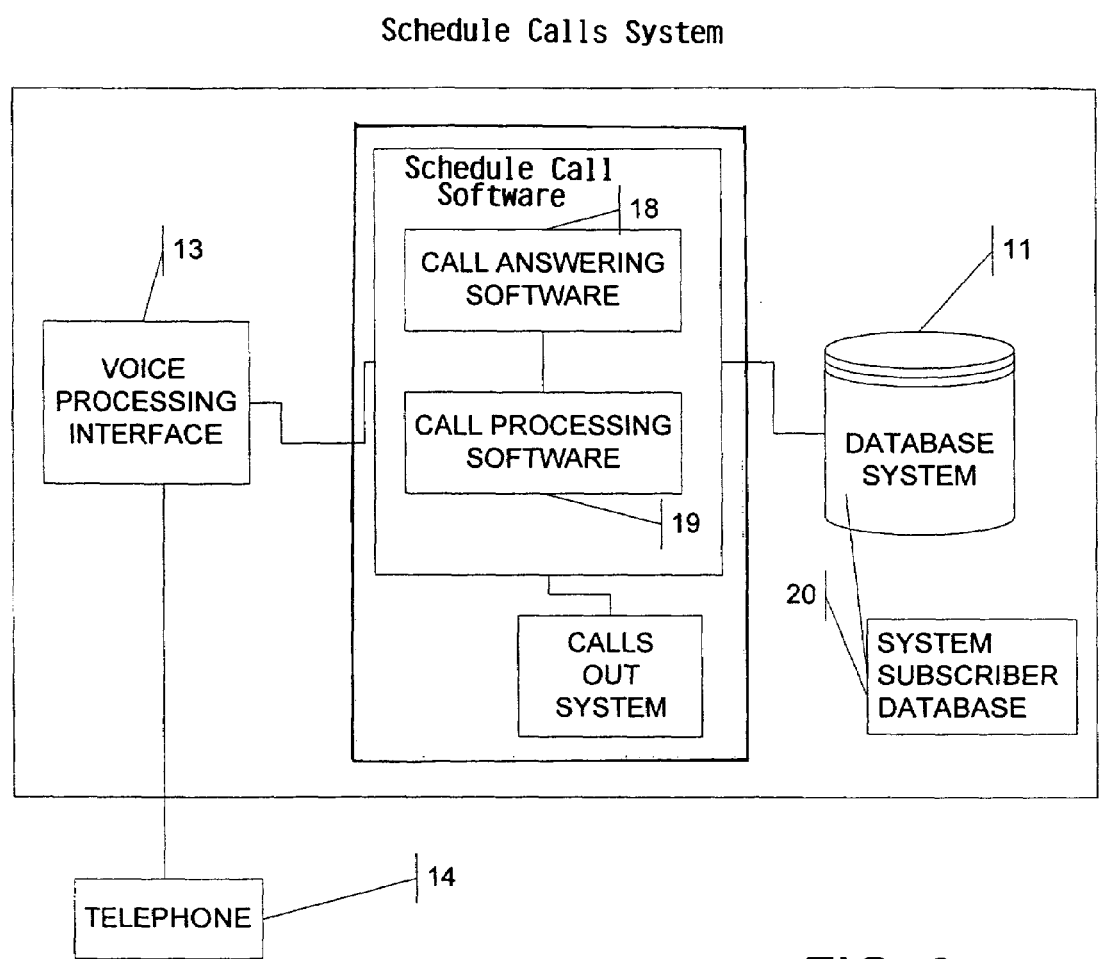
FIGS. 3–5 are simplified functional block diagrams of the call processing in accord with the present invention.
Figure 4:
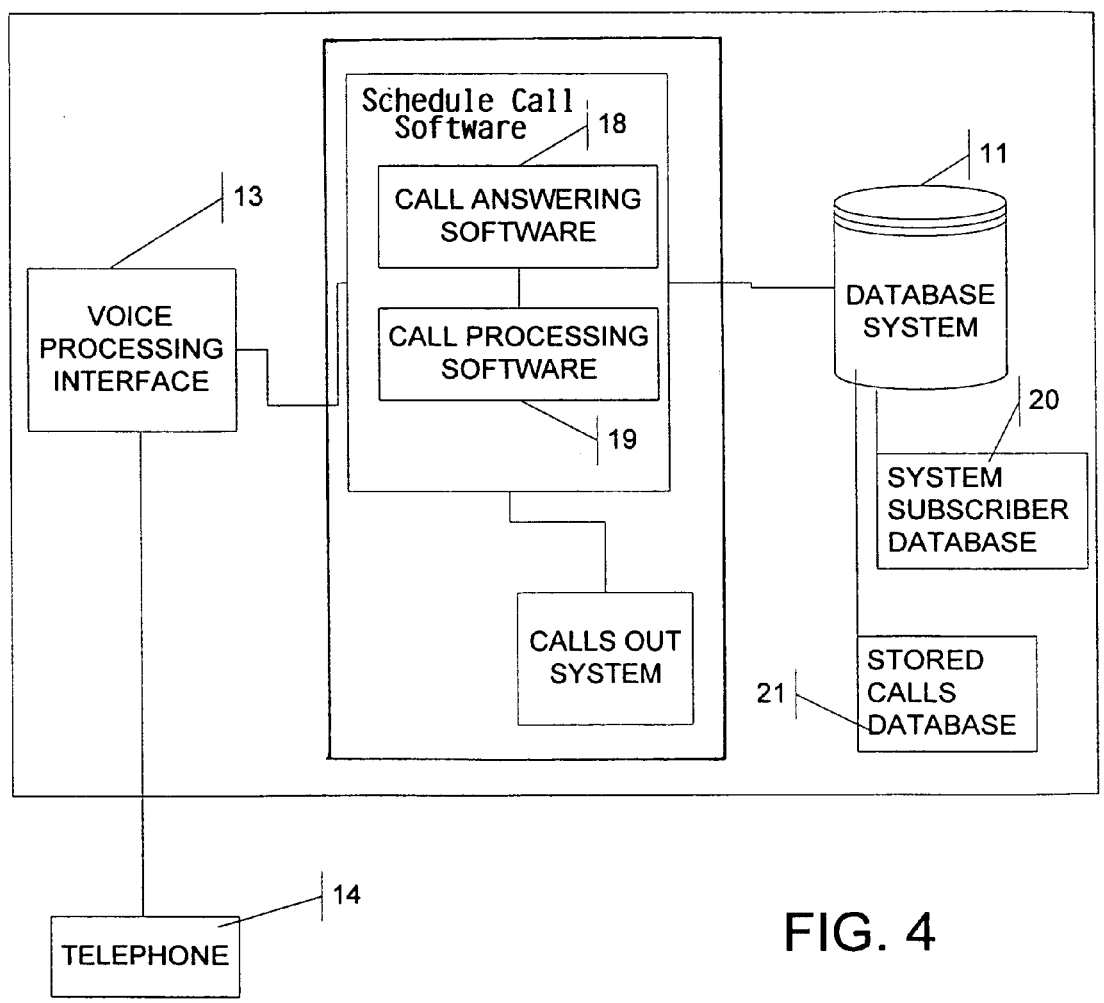
Figure 5:
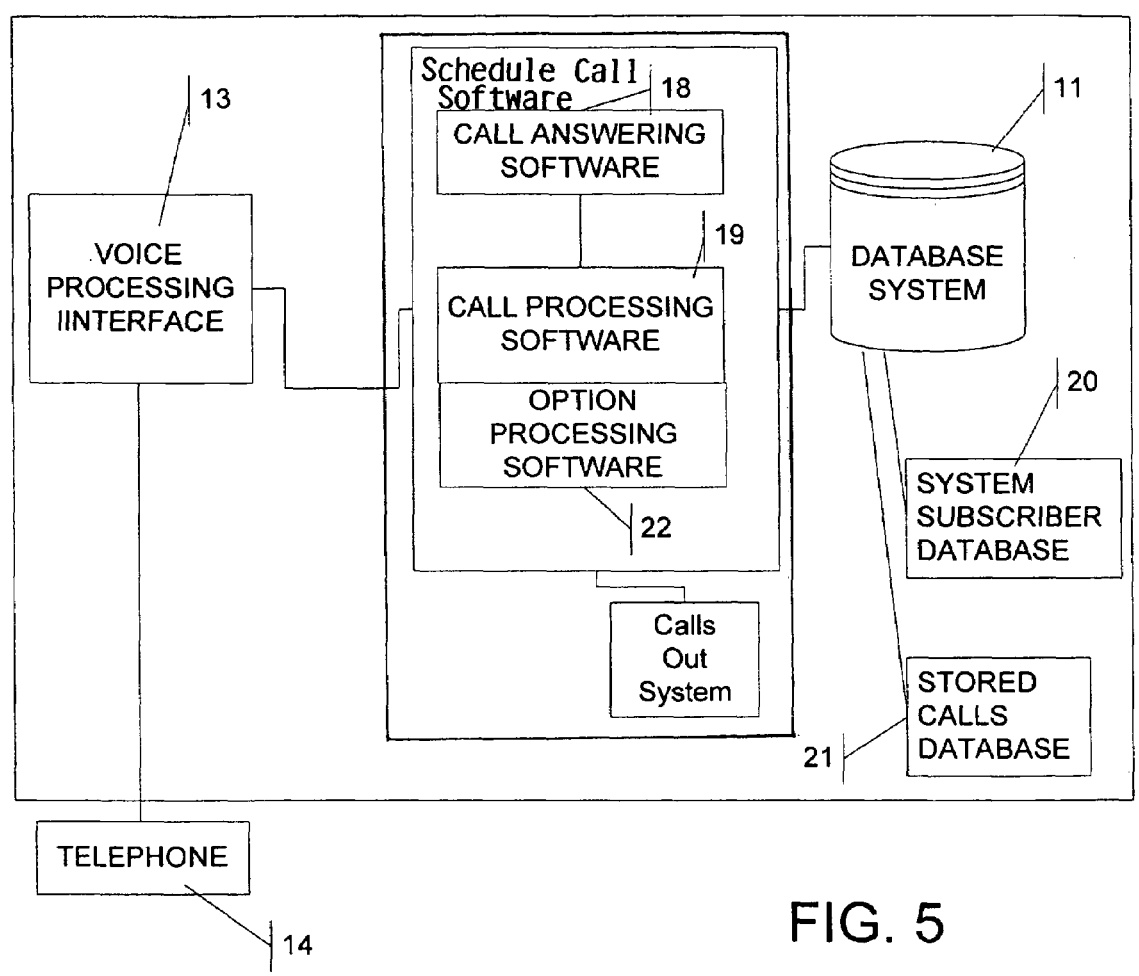

In FIG. 2, the Call Placement System 12 places a call based on the data retrieved from the Call Scheduler Software 15 and the Stored Calls Database 21. When the call is answered by the system subscriber the Call Placement System 12 retrieves the custom recorded message 17 from file 16 from the Database System 11 and plays the recording for the system subscriber. The Call Placement System 12 then hangs up the call and may or may not delete the recording file. In FIG. 3, the system answers the telephone 14 and the Voice Processing Interface 13 provides the Call Answering Software 18 with the caller identification information from the telephone service provider, if this information is not available the Call Answering Software 18 requests the caller's Personal Identification Number. Using this information, the caller's subscription data is retrieved from the System Subscriber Database 20. If the subscriber cannot be identified the system asks for the caller's Personal Identification Number (PIN). After identifying the caller as a subscriber the system plays the subscriber's stored name recording. In FIG. 4 the Call Processing Software 19 now collects from the caller the data needed in order to process the reminder call. The system first requests from the caller the date and time of the reminder call (which can be entered separately or at the same time) and then asks the caller if the entered data is correct. Then the system asks the caller to select which of their stored telephone number(s) the reminder call should be made to. Once all the data for the reminder call has been collected the Call Processing Software 19 stores the reminder call in the Stored Calls Database 21 and informs the caller that the call is stored. The caller may now hang up to complete the process or select one or more available options from a menu. In FIG. 5 if the caller continues the call, the Option Processing Software 22 plays the Option Menu to the caller. The caller can then select to begin the process over and create a different reminder message, or edit the database entries stored concerning information such as the Subscriber's Personal Identification Number or Recorded Name. If the caller selects to edit any of these fields the system will request the needed information, verify the changes with the caller and store the changes in the appropriate database system.

Figure 6:
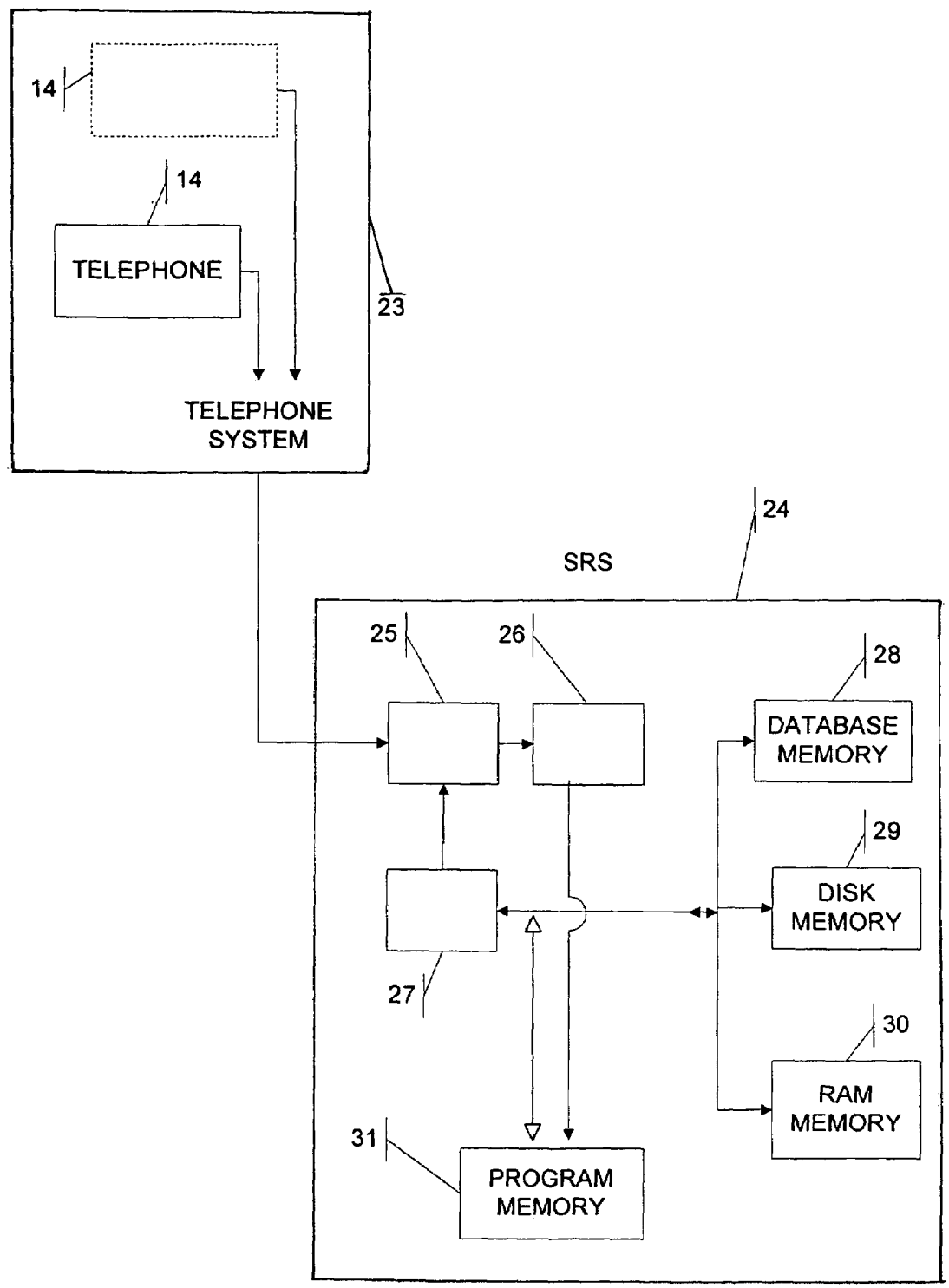
FIG. 6 is a simplified block diagram of the automated computerized voice message storage and redelivery system in accord with the present invention.

A simplified block diagram of an implementation of the present invention is shown in FIG. 6. A touch-tone telephone 14 is one of many phones that are connected to a standard telephone network 23, however configured in the circumstances. The present system and method is contained in the computer-based SRS 24, which includes a telephone connection circuit 25 and a voice recognition circuit 26. The outbound message circuitry 27 routes recorded messages and prompts to a telephone 14. Databases memory 28, hard drive memory 29 and RAM 30 are standard as understood in the art. Schedule call and reminder call software is loaded into memory 31 which may be of any time as understood in the art. Date and Time are provided by a real time clock and calendar.

The particular implementation of the present invention can vary widely depending upon cost and other factors as understood in the art. For example, user identification can be accomplished through the use of voice identification and comparison technology in lieu of PIN's or in addition thereto.

Appendices A and B (15 pages) are simplified flow charts for "schedule call" and Appendix C (5 pages) is a simplified flow chart for the "reminder call" function.

The system, both hardware and software, can be designed with common off-the-shelf components. By the very nature of the system, a portion of the design should include the ability to have a backup for hardware and software, including a plan for disaster recovery. Because of the need for fault resilience, backups, and disaster recovery the system components would normally not be those purchased through ordinary retail computer channels.

The software is and has been built with Application Generator software. The system can and does operate effectively with this software but can be written in a specific computer language to take advantage of software that might need to be available in the future.

The hardware is not proprietary, but the components are known to be Heavy Duty Industrial PC Components. These components are built to a more exacting standard needed in mission-critical applications that are to be available 24-hours a day, 7-days a week. (See Table 1)

Examples of Various Hardware and Software Components

1. One or more industry standard 19-inch hardware rack or cabinet.
2. One Unix or Windows NT based database server.
3. One or more Voice Recognition hardware systems based generally on, but not limited to Windows NT.
4. Two or many Unix or Windows NT based Call Handling systems.
5. One or more industry standard UPS (Uninterruptible Power Supply) systems.
6. One industry standard Ethernet Network Distribution Switch.
7. One or more accesses to telephone lines.
8. One or more call handling hardware boards (Dialogic or Aculab as examples).
9. One database software.
10. One voice Recognition software.
11. One Call Handling software.

Table 1

Appendix A (1 page) shows that the data and messages to be provided to a user may be provided by internet, E-mail written forms and the like and not just by telephone menu. Moreover, the data may be provided by a caregiver in the case of a user who is suffering from dementia, for example.

Appendix B (15 pages) illustrates the case where the necessary information is provided to the SRS via menu-driven queries by the SRS Custom messages may be recorded if desired or standard messages provided.

Appendix C (5 pages) illustrates the outbound calling from the SRS. The choice regarding human and /or digital voice recognition is established when the subscriber first establishes an account.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed is:

1. A method of scheduling a reminder call from an automated, computerized voice message storage and redelivery system (SRS) and receiving by a subscriber a reminder call from the SRS comprising the steps of:
    A. providing to the SRS when a reminder call is to be made by the SRS;
    B. providing to the SRS by a subscriber each telephone number that is to be called by the SRS to deliver a reminder call and information as to whether the telephone associated with the number will be answered by a human voice or a digital voice;
    C. providing to the SRS the message to be included in the reminder call;
    D. recording by the SRS the information provided in step A;
    E. calling a telephone number of step B as provided in step A;
    F. if the telephone number of step E is answered, determining by the SRS if a human voice or digital voice has answered the telephone;
    G. selecting a manner in which the message of step C will be delivered based upon the determination of step F;
    H. if a digital voice answers the telephone of step F, determining if the digital voice is an automated attendant answering system (AAA), a voice mail system (VMS), or an automated answer machine (AAM); and
    I. if an AAA or VMS answers the telephone, requesting by the SRS that the call be transferred to another telephone number if such was recorded in step D.

2. The method of claim 1 further including the step of:
    J. if an automated answer machine answers the call, providing by the SRS the message recorded in step D to the AAM.

3. The method of claim 1 further including the step of:
J. if such other telephone number is answered in step I, providing by the SRS the message recorded in step D to the one who answers.

4. The method of claim 1 wherein step B includes the step of:
J. providing to the SRS more than one telephone number that is to be called.

5. The method of claim 4 wherein step B further includes the step of:
K. providing to the SRS the order that the telephone numbers requested in step J are to be called.

6. The method of claim 1 wherein step A includes the step of:
J. providing the date a reminder call is to be made by the SRS.

7. The method of claim 6 wherein step A further includes the step of:
K. providing the time a reminder call is to be made by the SRS.

8. The method of claim 7 further including the step of:
L. calling the telephone number of step E on the date obtained pursuant to step J and at the time of step K.

9. The method of claim 8 wherein step L includes the step of:
M. if a digital voice is detected by the SRS in step F, calling the telephone number of step E at time intervals determined by the SRS.

10. The method of claim 9 wherein step M includes the step of:
N. providing to the SRS the number of attempts to be made by the SRS to detect a digital voice at the telephone number called in step M.

11. The method of claim 10 wherein step E includes the steps of:
O. calling the first telephone number pursuant to step N;
P. if the telephone is not answered by either a human or digital voice calling the second telephone number pursuant to step N; and
Q. if the second telephone number obtained is called and is not answered by either a human or a digital voice, calling the third telephone number pursuant to step N.

12. The method of claim 11 further including the steps of:
R. repeating steps O, P, and Q a predetermined number of times and, if no number is answered by either a human voice or digital voice, terminating steps O, P, and Q; and
S. hanging up the SRS telephone connection.

13. An automated, computerized voice message scheduling, storage and redelivery system for providing a reminder call to a remote telephone, comprising a computer means for executing software commands, a telephone connection means operatively connected to said computer means for calling and answering a telephone call from a remote location, a signal recognition means operatively connected to said telephone connection means and to said computer means for determining if a telephone called from said telephone connection means has been answered by a human voice or by a digital voice, memory means operatively connected to said computer means for scheduling and storing voice messages for remembering the number of each remote telephone and information as to whether the telephone will be answered by a human voice or digital voice providing by a subscriber to said system, program means for operating computer means for scheduling, receiving, recording, and redelivery of voice messages, said program means including means for calling a remote telephone number; means for determining if the telephone number is answered and determining by said signal recognition means if a human voice or digital voice has answered the telephone: means for providing that if a digital voice answers the telephone whether such digital voice is an automated attendant answering system (AAA), a voice mail system (VMS), or an automated answer machine (AAM) and further including means for requesting by the SRS that the call be transferred to another telephone number if such number was recorded if an AA or VMS answers the telephone.

14. The system as defined in claim 13 further including means for providing by the SRS the message recorded to the one who answers if such other telephone number is answered.

15. The system as defined in claim 13 further including means for providing by the SRS the message recorded to the AAM if an AAM answers the call.

16. A method of scheduling a reminder call from an automated, computerized voice message storage and redelivery system (SRS) and receiving by a subscriber a reminder call from the SRS comprising the steps of:
A. providing to the SRS when a reminder call is to be made by the SRS;
B. providing to the SRS by a subscriber, telephone numbers associated with a subscriber that are to be called by the SRS to deliver a reminder call and information as to whether the telephone associated with the numbers will be answered by a human voice or a digital voice;
C. providing to the SRS the message to be included in the reminder call;
D. recording by the SRS the information provided in step A;
E. calling a telephone number of step B as provided in step A;
F. if the telephone number of step E is answered, determining by the SRS if a human voice or digital voice has answered the telephone;
G. selecting a manner in which the message of step C will be delivered based upon the determination of step F; and
H. if a digital voice answers the telephone of step F, determining if the digital voice is an automated attendant answering system (AAA), a voice mail system (VMS), or an automated answer machine (AAM).

17. The method of claim 16 wherein step A includes the step of:
H. providing to the SRS that steps B–G will be repeated on predetermined days and at predetermined times.

18. The method of claim 16 further including the step of:
I. if an automated answer machine answers the call, providing by the SRS the message recorded in step D to the AAM.

19. The method of claim 16 further including the step of:
I. if an AAA or VMS answers the telephone, requesting by the SRS that the call be transferred to another telephone number if such was recorded in step D.

* * * * *